United States Patent
Iyer et al.

(10) Patent No.: US 10,545,850 B1
(45) Date of Patent: Jan. 28, 2020

(54) SYSTEM AND METHODS FOR PARALLEL EXECUTION AND COMPARISON OF RELATED PROCESSES FOR FAULT PROTECTION

(71) Applicant: Denso International America, Inc., Southfield, MI (US)

(72) Inventors: Gopalakrishnan Iyer, Santa Clara, CA (US); Ameer Kashani, Southfield, MI (US)

(73) Assignee: Denso International America, Inc., Southfield, MI (US)

( * ) Notice: Subject to any disclaimer, the term of this patent is extended or adjusted under 35 U.S.C. 154(b) by 0 days.

(21) Appl. No.: 16/164,042

(22) Filed: Oct. 18, 2018

(51) Int. Cl.
*G06F 11/36* (2006.01)
*G06F 11/30* (2006.01)
*G06F 11/07* (2006.01)

(52) U.S. Cl.
CPC ...... *G06F 11/3612* (2013.01); *G06F 11/0766* (2013.01); *G06F 11/302* (2013.01); *G06F 11/3055* (2013.01); *G06F 11/3616* (2013.01); *G06F 11/3644* (2013.01)

(58) Field of Classification Search
None
See application file for complete search history.

(56) References Cited

U.S. PATENT DOCUMENTS

| | | | |
|---|---|---|---|
| 7,577,992 B2 | 8/2009 | Abadi et al. | |
| 7,587,709 B2 * | 9/2009 | Chilimbi | G06F 11/3636 717/128 |
| 7,594,111 B2 | 9/2009 | Kiriansky et al. | |
| 8,434,064 B2 | 4/2013 | Akritidis et al. | |
| 8,468,592 B2 | 6/2013 | Sehr et al. | |
| 9,361,102 B2 | 6/2016 | Tan et al. | |
| 9,390,261 B2 | 7/2016 | Costa et al. | |
| 9,471,461 B2 | 10/2016 | Rhee et al. | |
| 9,569,613 B2 | 2/2017 | Yamada et al. | |
| 9,767,292 B2 | 4/2017 | Baji-Gal | |
| 9,698,973 B2 | 7/2017 | Johnson et al. | |
| 9,767,272 B2 | 9/2017 | Shanbhogue et al. | |
| 9,805,188 B2 | 10/2017 | Wesie | |
| 9,846,717 B2 | 12/2017 | Pike et al. | |

(Continued)

FOREIGN PATENT DOCUMENTS

WO   2017197519   11/2017

*Primary Examiner* — Daxin Wu
(74) *Attorney, Agent, or Firm* — Christopher G. Darrow; Darrow Mustafa PC

(57) ABSTRACT

System, methods, and other embodiments described herein relate to improving detection of program faults. In one embodiment, a method includes executing, in parallel, an extended program and an instrumented program. The instrumented program is an instrumented version of a baseline program that implements runtime checks. The extended program is an extended version of the baseline program with intentional delays inserted into source code of the baseline program to match an execution time with the instrumented program. The method includes supervising execution states of the instrumented program to identify an occurrence of mismatched states between the extended program and the instrumented program. The method includes managing the mismatched states to mitigate effects of the program faults on the functioning of an associated device.

20 Claims, 6 Drawing Sheets

(56) References Cited

U.S. PATENT DOCUMENTS

| | | | |
|---|---|---|---|
| 2009/0132848 A1* | 5/2009 | Martin | G06F 11/0709 |
| | | | 714/2 |
| 2009/0144561 A1 | 6/2009 | Davidson et al. | |
| 2011/0047412 A1* | 2/2011 | Martin | G06F 11/0709 |
| | | | 714/11 |
| 2013/0283245 A1 | 10/2013 | Black et al. | |
| 2014/0089736 A1* | 3/2014 | Okada | G06F 11/2736 |
| | | | 714/31 |
| 2014/0372983 A1* | 12/2014 | Presley | G06F 11/368 |
| | | | 717/124 |
| 2016/0299765 A1 | 10/2016 | Wesie et al. | |
| 2017/0024562 A1 | 1/2017 | Rombouts et al. | |
| 2017/0140148 A1 | 5/2017 | Gleeson et al. | |
| 2017/0177368 A1 | 6/2017 | DeHon et al. | |
| 2017/0213039 A1 | 7/2017 | Werner et al. | |
| 2017/0371635 A1 | 12/2017 | Davidson et al. | |
| 2018/0253369 A1* | 9/2018 | O'Dowd | G06F 11/3636 |
| 2019/0034256 A1* | 1/2019 | Fox | G06F 11/079 |
| 2019/0050217 A1* | 2/2019 | Tatourian | H04L 67/12 |

\* cited by examiner

```
Source Code 200

...
Printf(char *var){
While (var[i] != 'x\00'):
Putc(var[i]; i++;
}
...

#include <stdio.h>
Int main()[
Printf("Hello");
return 0;
]
```

FIG. 2

SYSTEM AND METHODS FOR PARALLEL EXECUTION AND COMPARISON OF RELATED PROCESSES FOR FAULT PROTECTION

TECHNICAL FIELD

The subject matter described herein relates in general to systems and methods for improving the resiliency of a program against faults, and, in particular, to executing separate versions of a program in parallel and detecting faults according to mismatched states between the programs.

BACKGROUND

Ensuring that a program conforms to various standards in relation to, for example, formatting, security, performance, and so on can be a significant difficulty especially when a program is relatively complex. The noted standards may relate to industry best practices for providing fault/error protection programs and/or to established safety/reliability standards for a particular implementation. In general, developers may include instrumentation within a program that performs various checks to facilitate conformance with the noted standards. The various runtime checks execute while the program is running to protect against either native (e.g., program bugs) and/or external difficulties (e.g., malicious attacks) and thereby provide protection against program faults/failures.

However, the instrumentation itself can at times be the source of the noted difficulties when not, for example, properly coded. Consequently, the functionality provided by the instrumentation such as program flow integrity may not function appropriately leading to further difficulties such as security holes, faults caused directly by the instrumentation itself, and so on.

SUMMARY

In one embodiment, example systems and methods associated with improving the fault tolerance of a program are disclosed. As previously noted, the process of instrumenting a program adds complexity to developing the program that can result in potentially under-instrumented source code, instrumentation that adds potential faults/errors into the program, and/or instrumented code that generally does not achieve the desired functionality. Such difficulties with providing runtime checks within the program can further complicate compliance with functional safety standards (e.g., ISO26262).

Therefore, in one embodiment, a supervisory control system is disclosed that actively monitors the execution of an instrumented program by executing a non-instrumented version of the program in parallel to identify the occurrence of fault conditions. For example, in one approach, the disclosed supervisory control system initially acquires the instrumented program by instrumenting a baseline program directly or by receiving the instrumented version of the program from another source. In either case, the instrumented program represents an instrumented version of the baseline program that includes instrumentation to implement runtime checks for achieving compliance with various functional safety standards or, more generally, providing protection against various risks.

Additionally, the supervisory control system acquires an extended program. The supervisory control system may directly generate the extended program or, as with the instrumented program, may acquire the extended program from a secondary source. In either case, the extended program is a version of the baseline program that has been adjusted to execute on a substantially identical timeline as the instrumented program. In one embodiment, the supervisory control system analyzes the instrumented program to identify execution cycles associated with separate statements such as the instrumentation. The supervisory control system, in one approach, uses counts of the execution cycles to determine when and where the instrumentation is executing and which cycles are attributable to the instrumentation.

With knowledge of the execution cycle counts, the supervisory control system, in one aspect, adds No-Op instructions into the baseline program to generate the extended program as a separate version of the baseline program. As indicated, the extended program does not include the instrumentation but does execute with substantially similar cycle counts because of the added No-Op instructions in the extended program. As such, the extended program and the instrumented program consume substantially similar execution times when performing the same tasks.

Thus, in one embodiment, the supervisory control system executes the instrumented program and the extended program in parallel. In one approach, the programs are embedded as firmware in separate controllers, and thus the supervisory control system executes the programs on the separate controllers in parallel. In alternative approaches, the supervisory control system executes the instrumented program as embedded firmware on a controller while executing the extended program on a virtual machine. In either case, the programs execute in lockstep because of the No-Op instructions embedded into the extended program.

Accordingly, the supervisory control system then supervises the execution of both the programs to identify program faults. That is, the supervisory control system uses the extended program as a point of comparison from which to monitor the instrumented program. Because the extended program is free of instrumentation that may result in various program faults, discrepancies in inputs values, intermediate values, output values, and other aspects shared between the two programs are considered to be indicative of potential or realized faults in the instrumented program. Thus, the supervisory control system supervises the execution of the programs by, in one embodiment, monitoring for the various values and comparing the values to identify mismatched execution states between the two programs.

In general, the occurrence of mismatched states provides for the inference that some error, malicious attack, or other aberration is underway that may result in a program fault. Consequently, because the program may be operating to control some safety-related aspect of, for example, a vehicle or other device, the occurrence of such a fault could result in injury or other difficulties that are undesirable. Therefore, the supervisory control system manages the mismatched states by, in one approach, resetting the controller(s) executing the programs. As a result, the supervisory control system corrects the mismatched states and avoids program faults. In this way, the supervisory control system improves the functionality of the program through better awareness of the execution states of the instrumented program and thus improves a resilience of the program to faults/errors.

In one embodiment, a supervisory control system for improving detection of program faults is disclosed. The supervisory control system includes one or more processors and a memory that is communicably coupled to the one or more processors. The memory stores an execution module including instructions that when executed by the one or more processors cause the one or more processors to execute, in parallel, an extended program and an instrumented program. The instrumented program is an instrumented version of a baseline program that implements runtime checks. The extended program is an extended version of the baseline program with intentional delays inserted into source code of the baseline program to match an execution time with the instrumented program. The memory stores a watchdog module including instructions that when executed by the one or more processors cause the one or more processors to supervise execution states of the instrumented program to identify an occurrence of mismatched states between the extended program and the instrumented program. The watchdog module includes instructions to manage the mismatched states to mitigate effects of the program faults on the functioning of an associated device.

In one embodiment, a non-transitory computer-readable medium for improving detection of program faults is disclosed. The computer-readable medium stores instructions that when executed by one or more processors cause the one or more processors to perform the disclosed functions. The instructions include instructions to execute, in parallel, an extended program and an instrumented program. The instrumented program is an instrumented version of a baseline program that implements runtime checks. The extended program is an extended version of the baseline program with intentional delays inserted into source code of the baseline program to match an execution time with the instrumented program. The instructions include instructions to supervise execution states of the instrumented program to identify an occurrence of mismatched states between the extended program and the instrumented program. The instructions include instructions to manage the mismatched states to mitigate effects of the program faults on the functioning of an associated device.

In one embodiment, a method of improving detection of program faults is disclosed. The method includes executing, in parallel, an extended program and an instrumented program. The instrumented program is an instrumented version of a baseline program that implements runtime checks. The extended program is an extended version of the baseline program with intentional delays inserted into source code of the baseline program to match an execution time with the instrumented program. The method includes supervising execution states of the instrumented program to identify an occurrence of mismatched states between the extended program and the instrumented program. The method includes managing the mismatched states to mitigate effects of the program faults on the functioning of an associated device.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

FIG. 2 illustrates one example of source code of a program.

DETAILED DESCRIPTION

Figure 1:
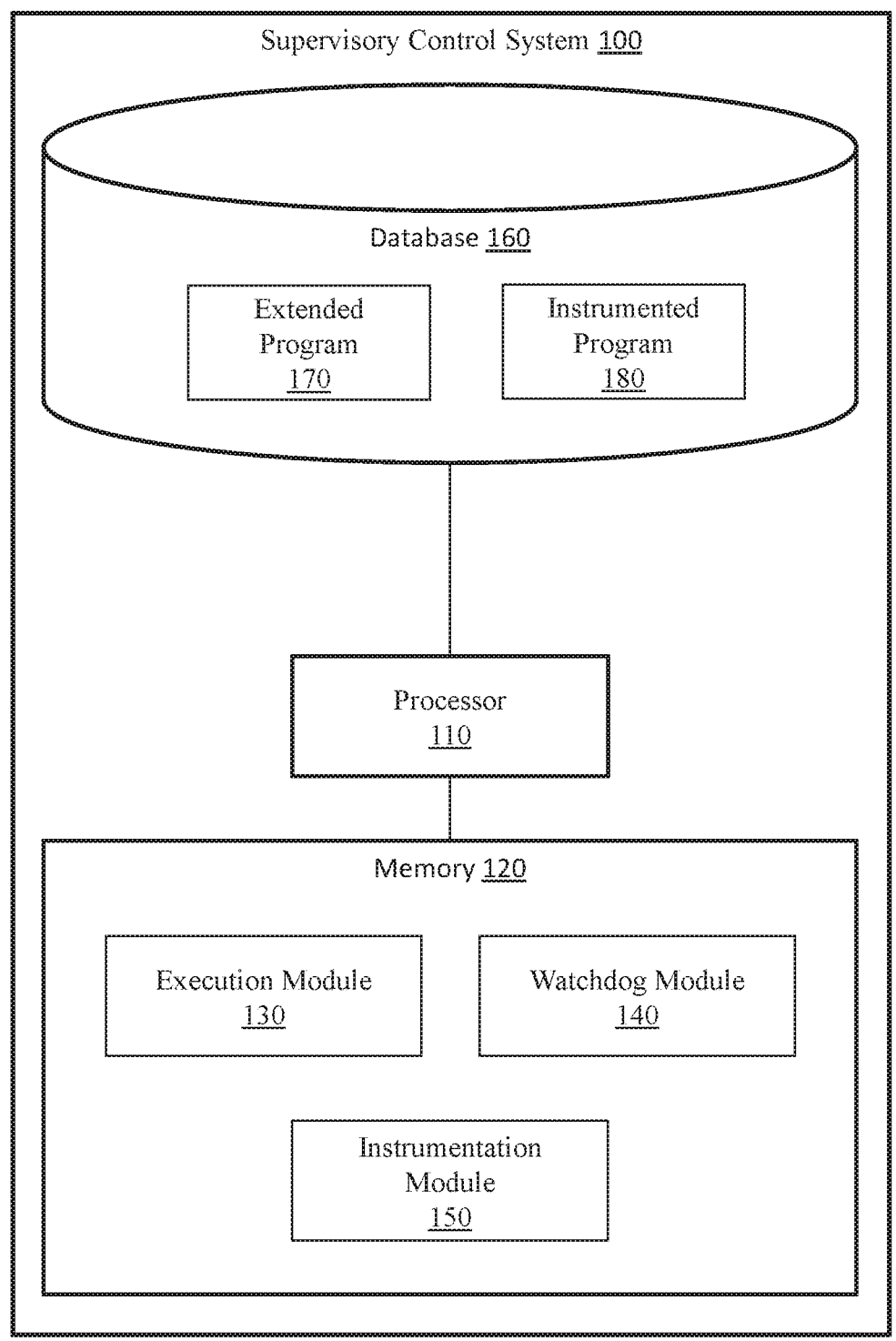
FIG. 1 illustrates one embodiment of a supervisory control system that is associated with improve tolerance of program faults in an instrumented program.

Systems, methods and other embodiments associated with improving the fault handling of a program are disclosed. As previously noted, current approaches to instrumenting a program can be complex, and thus result in instrumentation within that actually adds potential faults/errors into the program, and/or instrumented code that generally does not achieve the desired functionality. Such difficulties with providing runtime checks within the program can further complicate reliability and ultimately certification of the program.

Therefore, in one embodiment, a supervisory control system is disclosed that actively monitors the execution of an instrumented program through the monitored comparison of a non-instrumented extended version of the program that is executed in parallel. For example, in one approach, the disclosed supervisory control system uses two separate versions of the same baseline program to detect and manage program faults. The supervisory control system uses an instrumented version of the program and a non-instrumented/extended version of the program. The instrumented version represents the baseline program with modifications to include instrumentation that implement the runtime checks. The runtime checks perform various functions in support of the program such as performing checks for program flow integrity, data integrity, fault detection (e.g., memory corruption), and other such functions.

The extended version represents the baseline program with additional instructions to adjust execution time. No-Op instructions are added into the baseline program to form the extended program and extend execution times (i.e., cycle counts) to substantially match execution times with the instrumented program. Thus, in one embodiment, the supervisory control system executes the instrumented program and the extended program in parallel. In one approach, the programs are embedded as firmware in separate controllers, and thus the supervisory control system executes the programs on the separate controllers in parallel. In alternative approaches, the supervisory control system executes the instrumented program as embedded firmware on a controller (e.g., ECU) while executing the extended program on a virtual machine. In either case, the programs execute in lockstep because of the No-Op instructions embedded into the extended program that match execution times of the instrumented program.

Accordingly, the supervisory control system then supervises the execution of the programs to identify program faults. That is, the supervisory control system uses the extended program as a point of comparison for monitoring the instrumented program. Because the extended program is free of instrumentation that may result in various program faults, values from the extended program can be, for example, better trusted as not including instrumentation-related faults/errors. Accordingly, when discrepancies arise in inputs values, intermediate values, output values, and other such values between the two programs, the supervisory control system can consider the discrepancies/mismatches to be indicative of potential or realized faults in the instrumented program.

Consequently, the supervisory control system supervises the execution of the programs by, in one embodiment, monitoring for the various values and comparing the values to identify mismatched execution states between the programs. In general, the occurrence of mismatched states provides for the inference that some error, malicious attack, or other aberration is underway that may result in a program fault. Accordingly, the supervisory control system manages the mismatched states by, in one approach, resetting the programs. As a result, the supervisory control system corrects the mismatched states and avoids program faults. In this way, the supervisory control system improves the functionality of the instrumented program through better awareness of the execution states, and thus improves the resilience of the program to faults/errors.

Referring to FIG. 1, one embodiment of a supervisory control system 100 is illustrated. While arrangements will be described herein with respect to the supervisory control system 100, it will be understood that embodiments are not limited to a unitary system as illustrated. In some implementations, the supervisory control system 100 may be embodied as a cloud-computing system, a cluster-computing system, a distributed computing system, a software-as-a-service (SaaS) system, and so on. Accordingly, the supervisory control system 100 is illustrated and discussed as a single device for purposes of discussion but should not be interpreted as limiting the overall possible configurations in which the disclosed components may be configured. For example, the separate modules, memories, databases, and so on may be distributed among various computing systems in varying combinations.

The supervisory control system 100 also includes various elements. It will be understood that in various embodiments it may not be necessary for the supervisory control system 100 to have all of the elements shown in FIG. 1. The supervisory control system 100 can have any combination of the various elements shown in FIG. 1. Further, the supervisory control system 100 can have additional elements to those shown in FIG. 1. In some arrangements, the supervisory control system 100 may be implemented without one or more of the elements shown in FIG. 1. Further, while the various elements are shown as being located within the supervisory control system 100 in FIG. 1, it will be understood that one or more of these elements can be located external to the supervisory control system 100. Further, the elements shown may be physically separated by large distances.

Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements.

In either case, the supervisory control system 100 is implemented to perform methods and other functions as disclosed herein relating to improving fault detection and handling in relation to a program. The noted functions and methods will become more apparent with a further discussion of the figures. Furthermore, the supervisory control system 100 is shown as including a processor 110. Thus, in various implementations, the processor 110 may be a part of the supervisory control system 100, the supervisory control system 100 may access the processor 110 through a data bus or another communication pathway, the processor 110 may be a remote computing resource accessible by the supervisory control system 100, and so on. In either case, the processor 110 is an electronic device such as a microprocessor, an ASIC, a graphic processing unit (GPU) or another computing component that is capable of executing machine-readable instructions to produce various electronic outputs therefrom that may be used to control or cause the control of other electronic devices.

In one embodiment, the supervisory control system 100 includes a memory 120 that stores an execution module 130, a watchdog module 140, and an instrumentation module 150. The memory 120 is a random-access memory (RAM), read-only memory (ROM), a hard-disk drive, a flash memory, or other suitable memory for storing the modules 130, 140, and 150. The modules 130, 140, and 150 are, for example, computer-readable instructions that when executed by the processor 110 cause the processor 110 to perform the various functions disclosed herein. In various embodiments, the modules 130, 140, and 150 can be implemented in different forms that can include but are not limited to hardware logic, an ASIC, a graphic processing unit (GPU), components of the processor 110, instructions embedded within an electronic memory, and so on.

With continued reference to the supervisory control system 100, in one embodiment, the system 100 includes a database 160. The database 160 is, in one embodiment, an electronic data structure stored in the memory 120, a distributed memory, a cloud-based memory, or another data store and that is configured with routines that can be executed by the processor 110 for analyzing stored data, providing stored data, organizing stored data, and so on. Thus, in one embodiment, the database 160 stores data used by the modules 130, 140, and 150 in executing various determinations. In one embodiment, the database 160 stores a control flow graph, an instrumentation policy, a baseline program, an extended program 170, an instrumented program 180, and/or other data that may be used by the modules 130, 140, and 150 in executing the disclosed functions.

As used herein, the term "program" refers to compiled machine code that is derived from source code. Thus, the baseline program is, in one embodiment, a compiled program or portion thereof that is machine code. The phrase "machine code" as used herein generally refers to a program that is represented in machine language instructions that can be, for example, executed by a microprocessor such as the processor 110. Moreover, the machine code is generally understood to be a primitive or hardware-dependent language that is comprised of opcodes (e.g., No-Op instruction) defined by an instruction set implemented by associated hardware. Furthermore, the machine code itself is further comprised of data values, register addresses, memory addresses, and so on. Of course, while the program is discussed as being machine code, in further embodiments, the program is assembly code or another intermediate representation of the source code.

The source code from which the program is compiled is comprised of, for example, functions, data structures, objects, statements, and so on. Instrumentation that is included as part of the source code is further comprised of the same elements (e.g., objects, statements, etc.). In general, the program is organized as a set of functions. In various renditions, the functions may be nested within one another as sub-functions. Moreover, the functions are generally comprised of a set of statements (e.g., loops, I/O statements, etc.) and are typically focused on a particular functionality. That is, each separate function is generally implemented to perform a particular task. Thus, sub-functions may implement sub-routines in support of a broader functionality of a parent function. In either case, the functions include source code that defines the statements that form the function itself and provide for implementing the functionality associated with the function.

In one approach, the modules 130, 140, and 150 access electronic data of an integrated development environment (IDE) including electronic input and output streams including, for example, code segments provided electronically into the IDE. The modules 130, 140, and 150 may leverage an application program interface (API) of the IDE to facilitate the access. Moreover, such access may be provided in the form of application hooks that automate (e.g., provide direct integral access) access by the modules 130, 140, and 150. In either case, the system 100 and the modules 130, 140, and 150 may function cooperatively with the IDE to, for example, analyze the instrumented program 180 for execution times, generate the instrumented program 180, generate the extended program 170, and so on.

Continuing with elements of the database 160, the extended program 170 and the instrumented program 180 are shown as being stored in the database 160. Of course, in application, the extended program 170 and the instrumented program 180 are embedded in a memory of a respective controller (not illustrated) when executed. However, as shown in FIG. 1, for purposes of discussion, the programs 170 and 180 are stored in the database 160. Moreover, in one embodiment, the supervisory control system 100 initially stores and analyzes the extended program 170 and the instrumented program 180 from a local memory/data store such as the database 160. That is, as will be discussed in greater detail subsequently, in one embodiment, the supervisory control system 100 is configured to instrument the baseline program to produce the instrumented program 180. Moreover, the supervisory control system 100 may also generate the extended program 170 according to aspects associated with the instrumented program 180.

For example, in one embodiment, the database 160 stores a graph that is used by the instrumentation module 150 to instrument the baseline program and produce the instrumented program 180. The graph is, for example, a control flow graph that represents execution paths through the baseline program. In one embodiment, the instrumentation module 150 derives the graph from source code of the baseline program. The instrumentation module 150 forms the graph using, in one approach, nodes, and directed edges between the nodes.

The nodes represent blocks of the source code while the directed edges between the nodes represent jumps between the blocks. The blocks are atomic segments of code (e.g., uninterrupted) or at least integrally related segments of the source code. The directed edges, in one embodiment, indicate intra-procedural and/or inter-procedural control flow transfers between the blocks/segments. That is, the edges represent handovers, function calls, concrete and/or symbolic function arguments, and so on. In general, the directed edges illustrate transfers in the execution of the program between the separate blocks. It should be appreciated that in separate embodiments the nodes and directed edges may be defined according to a graph policy. The graph policy defines templates, example segments/conditions, and/or metrics for identifying the blocks/segments and jumps that form the nodes and edges, respectively. Thus, the system 100 can be implemented to flexibly define aspects of the graph according to separate implementations.

Figure 3:
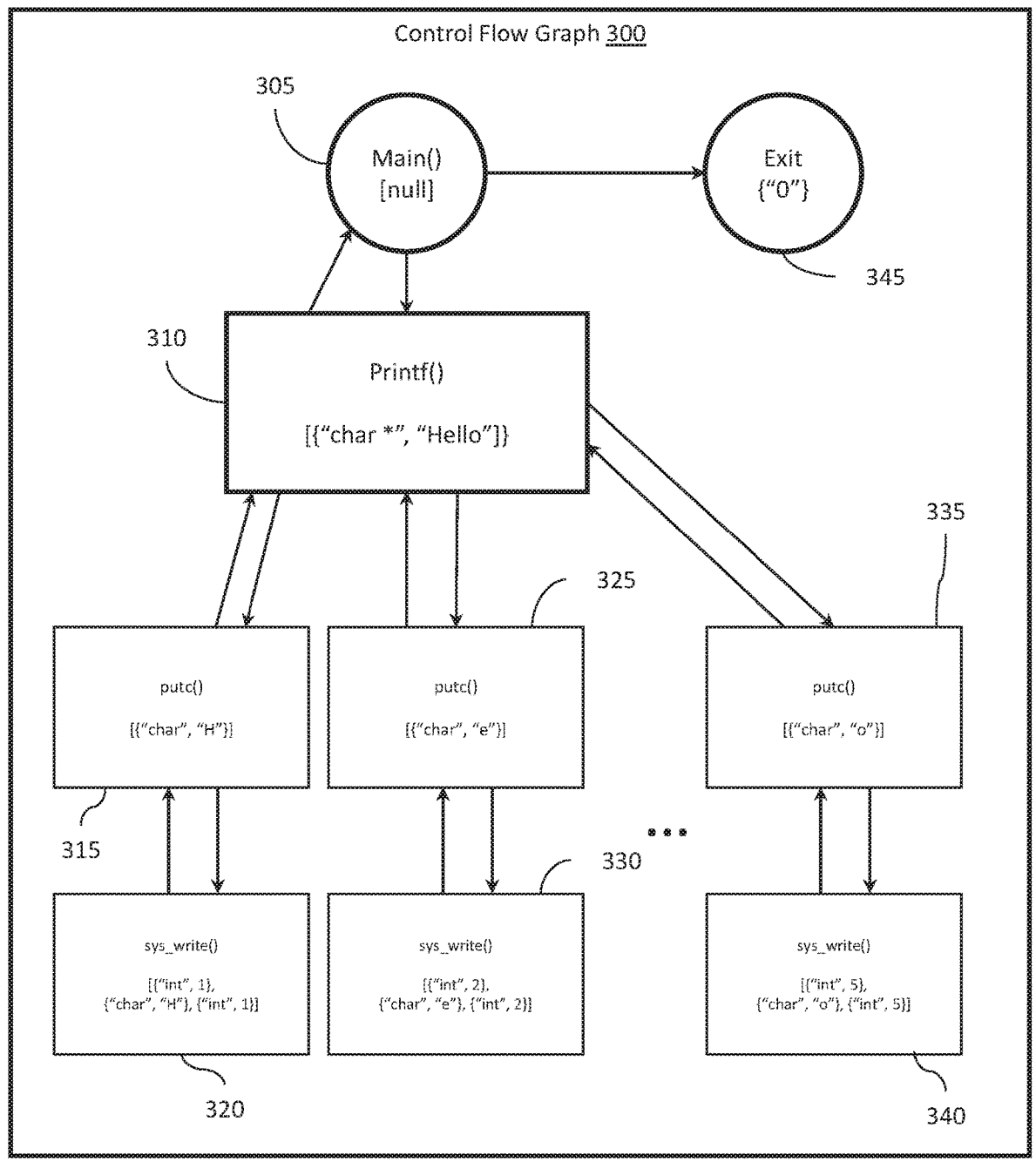
FIG. 3 illustrates one example of a control flow graph that the system of FIG. 1 derives from the source code of FIG. 2.

By way of example, FIG. 2 illustrates a sample segment of the source code of a program. Additionally, FIG. 3 illustrates an example control flow graph 300. The control flow graph 300 is an illustrative example of a graph as may be generated by the graph module 140 from inputs provided via the analysis module 130. Accordingly, the graph 300 includes nodes 305, 310, 315, 320, 325, 330, 335, 340, and 345 that correspond with segments/blocks of code from the source code 200. The graph 300 further illustrates directed edges between the nodes that correspond with relationships between the segments of the source code 200. Moreover, the separate nodes and directed edges are, for example, defined according to control flow characteristics of the source code. That is, the ways in which the blocks/segments of the source code inter-relate and delineations between the blocks/segments themselves are defined according to control flow characteristics of the source code. As will be discussed further subsequently, the instrumentation module 150 generally identifies the control flow characteristics from the source code of the program and may do so according to the graph policy defined within the system 100 in order to form the graph from which determinations about the inclusion of instrumentation are derived.

Continuing with the database 160 of FIG. 1, in one embodiment, the database 160 also includes an instrumentation policy that defines various conditions and/or segments of source code for which the instrumentation module 150 inserts instrumentation into the source code to ultimately form the instrumented program 180. In general, the instrumentation can serve different purposes depending on a particular implementation. For example, the instrumentation can be integrated within a function to provide for controlling program flow (e.g., ensuring the program is not misdirected), for debugging, for verifying data arguments, for verifying I/O, and so on. In an instance where the program controls an advanced driving assistance system (ADAS) to automatically adjust how a vehicle is controlled on the road, the instrumentation may include security instrumentation to prevent malicious manipulation of the program flow that could result in an accident and injury to passengers if the program is misdirected through a malicious attack (e.g., ensures program control flow integrity).

Additionally, the instrumentation policy, in one approach, defines characteristics relating to the instrumentation itself and also to how the instrumentation module 150 is to include No-Op instructions in the baseline program to generate the extended program. For example, the instrumentation policy indicates cycle counts for different instrumentation statements as included within various templates defined by the instrumentation policy. Accordingly, along with specifying the instrumentation in the form of templates for customization and inclusion within the program, the instrumentation policy indicates characteristics of the instrumentation such as a number of execution cycles consumed by the instrumentation. As such, when subsequently generating the extended program 170, the instrumentation module 150, in one approach, references the instrumentation policy to determine execution cycles attributable to the instrumentation and thus a corresponding number of No-Op instructions to insert within the extended program 170 to account for the execution time of the instrumentation.

In still further aspects, the instrumentation policy defines how the baseline program is instrumented with No-Op instructions to generate the extended program 170. That is, the instrumentation policy defines a form of the No-Op instructions, where the No-Op instructions are to be inserted, and other details regarding instrumenting the baseline program to form the extended program 170 using the No-Op instructions to match execution times.

Moreover, the instrumentation policy may also define further aspects relating to how programs are instrumented. Accordingly, in one embodiment, the instrumentation policy defines instrumentation thresholds or at least metrics for generating the instrumentation thresholds. In one approach, the instrumentation policy defines instrumentation thresholds for different classes of functions such that characteristics of the functions are to satisfy an associated instrumentation threshold in order to be modified with instrumentation. For example, the instrumentation policy, in one embodiment, defines classes for functions according to a security level as may be tagged by a developer or derived according to defined metrics associated with code segments in the function. Thus, the instrumentation policy can indicate a first threshold for a first class, a second threshold for a second class, a third threshold for a third class and so on. In general, the separate classes and associated thresholds for security levels may relate to a vulnerability of a particular function (e.g., exposure to manipulation) or to other aspects. Thus, the instrumentation policy may indicate different thresholds at which segments are to be instrumented in order to optimize inclusion of the instrumentation. In practice, the instrumentation module 150, for example, assesses the code segments and automatically includes the instrumentation according to the assessment in order to generate the instrumented program 180.

Moreover, the actual instrumentation itself that is included within the code segments is defined, in one embodiment, as templates within the instrumentation policy or the aforementioned graph policy. For example, the templates define a set of standardized instrumentation that performs various functions in relation to controlling program flow, verifying I/O, providing additional functional hooks, performing fault handling, data integrity checks, and so on. Moreover, the templates, in one approach, further indicate variables within the instrumentation templates that are, for example, customized by the instrumentation module 150 according to a particular code segment with which the instrumentation is included. That is, the instrumentation module 150, in one example, may include instrumentation to verify a return address of a function. Thus, the instrumentation module 150 modifies variables of an associated instrumentation statement from the template to correspond with the associated source code and provide security or other functionality for the associated source code segment by using the template as a base. Further aspects of the instrumentation policy and the instrumentation module 150 will be discussed subsequently.

Continuing with FIG. 1, the instrumentation module 150, in one embodiment, includes computer-readable instructions that when executed by the processor 110, cause the processor to generate a control flow graph from which the instrumentation module 150, for example, automatically instruments the baseline program to form the instrumented program 180. The instrumentation module 150 forms the graph by identifying control flow characteristics of the source code of the baseline program. That is, the instrumentation module 150 analyzes the source code (either in real-time as the source code is developed or upon request) to identify the control flow characteristics. In one embodiment, the control flow characteristics include intra-procedural and/or inter-procedural control flow transfers of the baseline program such as function calls, and return address along with symbolic names, concrete and/or symbolic function arguments and return values, along with a calling convention, and so on. More generally, the control flow characteristics relate to any aspects that influence a form and/or content of the graph. Thus, the instrumentation module 150 undertakes the noted monitoring and analysis, in one embodiment, in real-time in order to identify the control flow characteristics so that the instrumentation module 150 can maintain the graph in an updated form.

It should be noted that the instrumentation module 150, in general, generates the graph as an electronic data structure that includes programmatic elements for representing the nodes and directed edges. Initially, in one approach, the instrumentation module 150 generates the graph including null values or just an entry node from which the instrumentation module 150 builds the control flow graph as the source code is developed. Thus, the instrumentation module 150 can update the graph in real-time as adjustments/modifications are made to the graph. Accordingly, the instrumentation module 150, in one embodiment, actively uses the control flow characteristics to generate the control flow graph. Accordingly, the instrumentation module 150 can develop the graph in a piecewise manner as the modifications/additions occur in order to provide a real-time assessment of the baseline program defined by the source code.

Additionally, the instrumentation module 150 includes instructions that when executed by a processor cause the processor (e.g., processor 110) to integrate instrumentation within the source code according to the control flow graph. For example, in one approach, the instrumentation module 150 adds instrumentation into the source code as referenced by the graph. The instrumentation module 150, in one embodiment, includes instrumentation where program flow is to be ensured and/or where the instrumentation is to provide separate functionality in relation to particular code segments of the source code.

As previously noted, the instrumentation policy indicates various mechanisms for identifying which aspects of the source code (e.g., via metrics or other conditions for identifying locations and types of instrumentation) are to be instrumented. In various aspects, the instrumentation included by the instrumentation module 150 is to enforce runtime checks within the program by ensuring execution of the program follows the control flow graph. Thus, the instrumentation module 150 generally uses the knowledge of the program flow conveyed via the graph in order to know how to include instrumentation for enforcing the program flow. Moreover, the instrumentation module 150, in further aspects, also references the graph to understand data flows, potential fault conditions along hazardous execution paths, and other aspects that are instrumented within the program. In this way, the instrumentation module 150 improves the security of the program by automatically instrumenting runtime checks within the instrumented program 180. Furthermore, the instrumentation module 150, in one embodiment, includes instrumentation to perform address checks (e.g., memory addresses for data and program flow), variable/function return type checks, data-bound checks, opcode checks, match call-return pairs (non-single class), and so on.

In either case, the instrumentation module 150 analyzes the source code and the control flow graph to integrate instrumentation within the source code. In particular, the instrumentation module 150 identifies segments of the source code that are to be instrumented according to correlations between the control flow graph and the source code such as procedural jumps within the source code as identified by directed edges in the graph. Moreover, the instrumentation module 150 automatically adds the instrumentation according to the identified segments by modifying templates of defined instrumentation to customize the defined instrumentation of the templates according to the source code. In this way, defined sets of instrumentation can be, for example, pre-tested and certified in order to ensure the added instrumentation performs as desired.

In still further aspects, the instrumentation module 150 includes the instrumentation according to tagged/labeled sections of the source code. For example, the provided label may indicate a sensitive/high-value function that is to be instrumented with control flow instrumentation, whereas in further aspects the provided label/tag may not specify characteristics of the instrumentation but simply indicates that the portion of the code should be analyzed by the instrumentation module 150 to be automatically instrumented. While the instrumentation module 150 is discussed as automatically generating the instrumented program 180 from the baseline program, of course, in alternative approaches, the instrumented program 180 is acquired from a secondary source and is thus pre-instrumented. In still further aspects, the instrumentation module 150 adds at least a portion of the instrumentation into the instrumented program 180 while other sections are previously included.

In either case, the instrumentation module 150 includes instructions to analyze the instrumented program 180 in order to determine execution times associated with various statements. As an initial note, as used herein, cycle counts, execution times, execution cycles, and other such related phrases all refer to an amount of time consumed on a processor, controller or other executing device by a particular instruction or segment of instructions. In general, the processor/controller operates at a defined frequency (e.g., 100 MHz) which indicates how many processing cycles within the processor/controller are performed per second. It should be appreciated that various instructions use different numbers of cycles in order to execute and then be retired from an instruction cache of the processor/controller. However, separate instructions generally consume bandwidth of the processor/controller in relation to a number of cycles used to perform particular tasks associated with the instruction (e.g., ADD, JUMP, STORE, LOAD, BRANCH, etc.). Consequently, it should be further understood that separate instructions individually contribute to the overall execution time of a program as a general matter.

As previously indicated, the instrumentation policy, in one embodiment, identifies cycle counts as characteristics of the particular segments of instrumentation within the templates. Thus, in one approach, as the instrumentation module 150 inserts instrumentation into the program, the instrumentation module 150 also tracks locations within the instrumented program where the instrumentation is added (e.g., in relation to program flow) along with associated cycle counts. Thus, the instrumentation module 150 develops a cycle mapping that indicates expected additional execution times for the individual segments of instrumentation and relative points in the program flow where the instrumentation executes. In one embodiment, the instrumentation module 150 includes the cycle mapping in the control flow graph as a manner of directly referencing the instrumentation at different control flow points in the instrumented program and providing a means to indicate cycle counts.

In an alternative arrangement, the instrumentation module 150 executes the instrumented program 180 in a test environment to track and identify execution cycles associated with the instrumentation. In one approach, the instrumentation module 150 executes the baseline program as part of the test environment in order to provide a comparison of the instrumented program 180 with the baseline program and to identify therefrom execution time of the processor/controller that is attributable to the separate instrumentation instructions. Consequently, the instrumentation module 150 identifies the amount of execution time attributable to the instrumentation.

Whichever approach is undertaken, the instrumentation module 150 subsequently generates the extended program 170 to match execution times with the instrumented program 180. That is, as the instrumented program 180 is executing, the extended program 170 is also executing at the same or a similar point within the program flow as related back to the baseline program. Where the instrumented program 180 may be executing instrumentation statements, the extended program 170 is constructed to execute No-Op instruction(s). The No-Op instructions are instructions implemented by associated hardware (e.g., processor or controller) that cause the hardware to do nothing for an execution cycle. Thus, the No-Op instructions effectively delay execution in the extended program 170 while the instrumentation is executing in the instrumented program 180.

Accordingly, the instrumentation module 150 inserts the No-Op instructions into the baseline program to generate the extended program in such a way so as to match execution of the extended program 170 and the instrumented program. In one embodiment, the instrumentation module 150 uses the control flow graph and/or the cycle mapping to determine where, how many, and other characteristics of the No-Op instructions that are inserted into the baseline program to generate the extended program 170. Thus, when the execution module 130 executes the instrumented program 180 in parallel with the extended program 170, the two programs execute in lockstep with the extended program substituting the No-Op instructions into execution when the instrumented program 180 is executing instrumentation.

Accordingly, in one embodiment, the execution module 130 includes instructions that function to execute the instrumented program 180 and the extended program in parallel. In general, the execution module 130 controls the programs to initiate execution at the same time in order to ensure execution is simultaneous and in parallel. Moreover, the execution module 130, in one aspect, ensures the initial states of the two programs also match. Thus, the execution module 130 may initialize one or more memory locations to store the same values in order to ensure the two programs are similarly initiated.

Furthermore, as previously indicated, the instrumented program 180 and the extended program 170 execute on, for example, separate controllers, a combination of a controller and a virtual machine, or another suitable configuration such that the watchdog module 140 can supervise the execution. Thus, the execution module 130 may control or otherwise access the controller(s) in order to ensure the programs execute in lockstep (i.e., together in parallel at the same points relative to the baseline program). Moreover, where the extended program 170 executes on a virtual machine on a microprocessor, the execution module 130 controls the virtual machine and the extended program in order to ensure that the virtual machine is configured with similar characteristics as the controller (e.g., a same clock frequency) so that execution of the two programs is coincident. In any case, the execution module 130 generally functions to ensure that aspects of the execution environment(s) for the instrumented program 180 and the extended program 170 correspond so that the programs can execute within substantially identical circumstances in order to ensure execution is the same except for the presence of instrumentation or not within the respective program.

Figure 4:
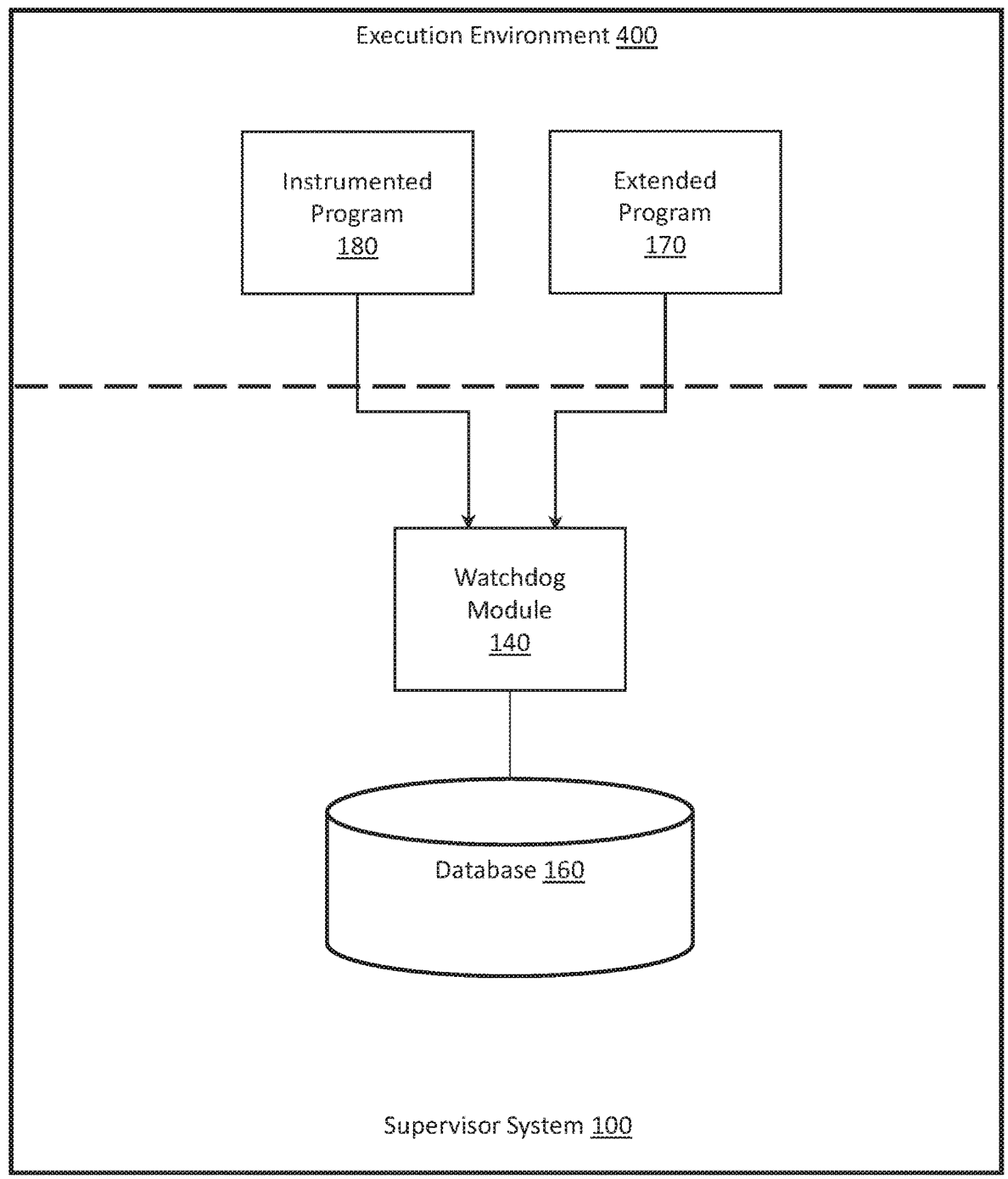
FIG. 4 illustrates one embodiment of an execution environment in which the extended program and the instrumented program execute.

As such, the watchdog module 140, in one embodiment, includes instructions that function to supervise the execution of the instrumented program 180 and the extended program 170. In general, the watchdog module 140 monitors the inputs, outputs, and internal states of the programs for mismatches or values that are outside of an acceptable known range. For example, as illustrated in FIG. 4, the instrumented program 180 and the extended program 170 execute within an execution environment 400. The execution environment 400 is a representation of a particular configuration in which the programs 170 and 180 execute, which may include separate controllers, separate processes on the same controller, a discrete controller and a virtual machine on a discrete processor, or another suitable configuration. In either case, the execution environment 400 is configured such that the watchdog module 140 can access the respective programs in order to acquire the execution states of the programs.

Thus, the watchdog module 140, in one embodiment, accesses the execution states (e.g., internal values, inputs, outputs, memory address, etc.), through an API, configuration of the execution environment 400, or other suitable means. The execution states of the respective programs refers to values of variables that change as the programs execute. Thus, in one embodiment, the execution states include combinations of input values, output values, control argument values, non-control argument values, intermediate calculation values within the program, and so on. It should be appreciated that the values that form the monitored execution states may vary according to a particular implementation but may generally include any combination of values associated with the execution of the programs.

The watchdog module 140, in one embodiment, compares the acquired execution states to determine whether a program fault, error, or other aberration is present. In one approach, the watchdog module 140 accesses the internal values of the instrumented program 180 and the extended program 170 via the execution environment (e.g., environment 400 as illustrated in FIG. 4). The watchdog module 140 then compares the values that form the execution states at, for example, each execution cycle.

Moreover, in one aspect, the watchdog module 140 also compares the values from at least the instrumented program 180 with a map of possible ranges for the values to determine whether the values are within reason. That is, for example, the watchdog module 140 and/or the execution module 130 determine ranges of values for the different execution states according to, for example, a history of logged values. Using this history, the watchdog module 140 analyzes the values to determine whether or not they fall within the range.

Accordingly, when the watchdog module 140 determines that execution states between programs are mismatched (i.e., are not equal) or that the values do not fall within the range of possible values, then the watchdog module 140 manages the mismatch. In one approach, the watchdog module 140 manages the mismatch by resetting the controller of the offending program (i.e., the controller of the instrumented program 180). Of course, upon the occurrence of the reset, the extended program is also reset in order to ensure that the two programs continue to execute in parallel with matched states. In further approaches, the watchdog module 140 resets memory values (e.g., inputs, internal values, program counter, etc.) in order to reset the programs. In this way, the supervisory control system 100 monitors and manages an instrumented program to improve handling of program faults.

Figure 5:
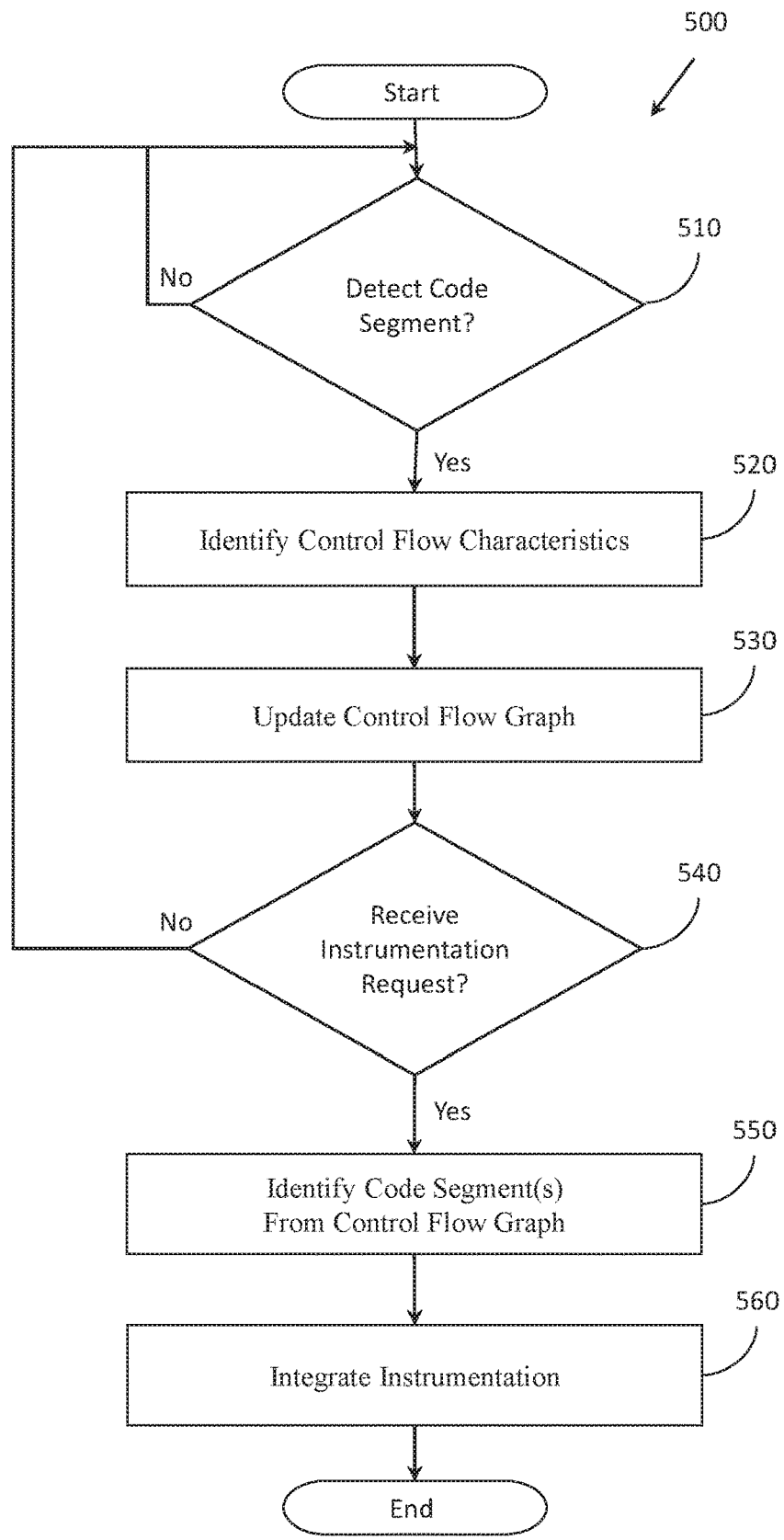
FIG. 5 illustrates one embodiment of a method associated with automatically instrumenting source code.

FIG. 5 illustrates a method 500 associated with automatically instrumenting source code of a program. Method 500 will be discussed from the perspective of the supervisory control system 100 of FIG. 1. While method 500 is discussed in combination with the supervisory control system 100, it should be appreciated that the method 500 is not limited to being implemented within the supervisory control system 100 but is instead one example of a system that may implement the method 500.

At 510, the instrumentation module 150 monitors for and periodically detects a code segment being added to the source code of the program. It should be noted, that as used herein, adding a code segment at 510 generally refers to adding new code segments, and also modifying existing code segments within the source code of the program. Additionally, while the generation of a control flow graph and instrumentation of the program are discussed as occurring in real-time, in further aspects, these functions may occur in response to a discrete request that is, for example, generated when the program is complete and/or ready to be compiled.

The instrumentation module 150 monitors an electronic input stream into an integrated development environment (IDE) within a computing device for inputs (e.g., code, commands, etc.) that involve changes to the source code. Accordingly, the instrumentation module 150, in one embodiment, continuously monitors the input stream into the IDE through an API to identify when the source code is being modified (i.e., added to or changed). Consequently, upon detecting the noted modification or a discrete request to analyze the source code, the execution module 130 proceeds to identify control flow characteristics at block 520.

At 520, the instrumentation module 150 identifies the control flow characteristics of the source code. In one embodiment, the instrumentation module 150 analyzes the source code of the baseline program using a depth-first search to traverse statements within the source code. In further aspects, the instrumentation module 150 implements other suitable approaches to traversing the source code and identifying the characteristics as may be appreciated. When the instrumentation module 150 is traversing the source code, the instrumentation module 150 is parsing statements within the source code to identify at least function calls, function return addresses, concrete and/or symbolic function arguments, function return values, and relationships between the statements as the control flow characteristics.

In various implementations, the execution module 130 analyzes effected portions of the source code associated with the detected code segment/changes from 510, while in further aspects, the instrumentation module 150 re-analyzes the source code overall to identify the control flow characteristics in response to a change. In general, the approach that is undertaken is related to characteristics of the source code, preferences defined in the system 100, and available resources for performing the analysis. Whichever approach is performed by the instrumentation module 150, extracting the control flow characteristics provides information about intra-procedural and/or inter-procedural control flow transfers of the program that are to be represented in the graph. In one embodiment, further aspects may be identified as part of the control flow characteristics such as non-control data arguments, fault trees, and so on. In either case, the execution module 130 can include aspects that are both, directly and indirectly, related to the program flow within the control flow characteristics for inclusion in the graph.

At 530, the instrumentation module 150 updates the control flow graph. In one embodiment, the instrumentation module 150 uses the control flow characteristics identified at 520 in order to form nodes and directed edges of the graph. Consider that the control flow graph generally represents execution paths through the baseline program, and thus the instrumentation module 150 uses the control flow characteristics to identify the paths (e.g., directed edges) between different code segments (e.g., nodes) from which the graph is formed. Thus, the instrumentation module 150 updates the control flow graph by adding the control flow characteristics corresponding to the detected code segment while modifying existing nodes and edges of the control flow graph to accommodate the code segment. That is, for example, existing directed edges may be re-routed while additional nodes are added, existing nodes may be modified, indicated conditions can be modified or new conditions added, and so on.

At 540, the instrumentation module 150 monitors for and detects a request to instrument the source code. In various embodiments, the request may take different forms. For example, in one approach, the request is coincident with any modifications to the source code for which the graph is modified. That is, when the graph is updated according to modifications to the source code, the instrumentation module 150 also functions to instrument the source code in real-time for the modifications if instrumentation is to be included for added code segments or changes to the existing code segments. Alternatively, the instrumentation request is generated by the system 100 once the source code is completed, according to a discrete request, or, in a further aspect, when the source code is to be compiled into the program. Accordingly, the request to instrument the source code is, in one embodiment, generated by the system 100 in response to a request to compile the source code generated within the IDE, and is acted upon prior to the compiling.

At 550, the instrumentation module 150 identifies code segments of the source code that are to be instrumented. In one embodiment, the instrumentation module 150 identifies the code segments according to existing tags placed on the segments in the source code, according to labeled characteristics in the graph associated with the code segments, according to identified control flows represented in the control flow graph, and/or according to further metrics/characteristics as defined by the instrumentation policy. In general, the instrumentation module 150 is instrumenting the source code to ensure program flow integrity, data integrity, and other aspects of the program during execution including, for example, preventing malicious redirection. Thus, the instrumentation module 150 identifies code segments that are involved in transferring control between functions, adjusting program flow addresses, and other such code segments. In general, the noted code segments are associated with the directed edges within the graph or conditions associated with transfers embodied by the directed edges.

At 560, the instrumentation module 150 integrates instrumentation within the source code of the baseline program to form the instrumented program 180. As previously noted, in one embodiment, the instrumentation module 150 includes the instrumentation according to the control flow graph to enforce runtime checks within the program that improve the resiliency of the program against various faults and/or attacks. That is, the instrumentation that is added to the source code ensures the program cannot be re-directed outside of the execution paths represented by the graph, that data associated with the program is not maliciously manipulated, and so on.

Moreover, the process of integrating the instrumentation includes, in one embodiment, the instrumentation module 150 automatically adding the instrumentation by modifying templates of defined instrumentation according to respective locations in the source code that are to receive the instrumentation. As previously explained, the instrumentation module 150 adjusts variable aspects of the templates to conform to a code segment with which the instrumentation is being integrated. Accordingly, the instrumentation module 150 customizes the included instrumentation to achieve the particular functionality. In this way, the instrumentation module 150 uses the control flow graph to provide additional functionality that ultimately improves the resulting program by ensuring secured program flow. However, the added instrumentation can at times experience difficulties and does add to the overall execution time of the program.

Thus, as part of integrating the instrumentation at 560, the instrumentation module 150, in one embodiment, tracks the integration of the various instrumentation instructions by generating a cycle mapping that stores locations and execution cycle counts for the instrumentation added to the baseline program to form the instrumented program 180. Alternatively, the instrumentation module 150 tracks at least a location and type of the instrumentation instructions in order to provide for subsequent analysis/predictions about execution cycles that are likely to be consumed by the instrumentation at various execution points in the program. In this way, the instrumentation module 150 provides additional means for subsequently generating the extended program 170, as previously discussed.

Figure 6:
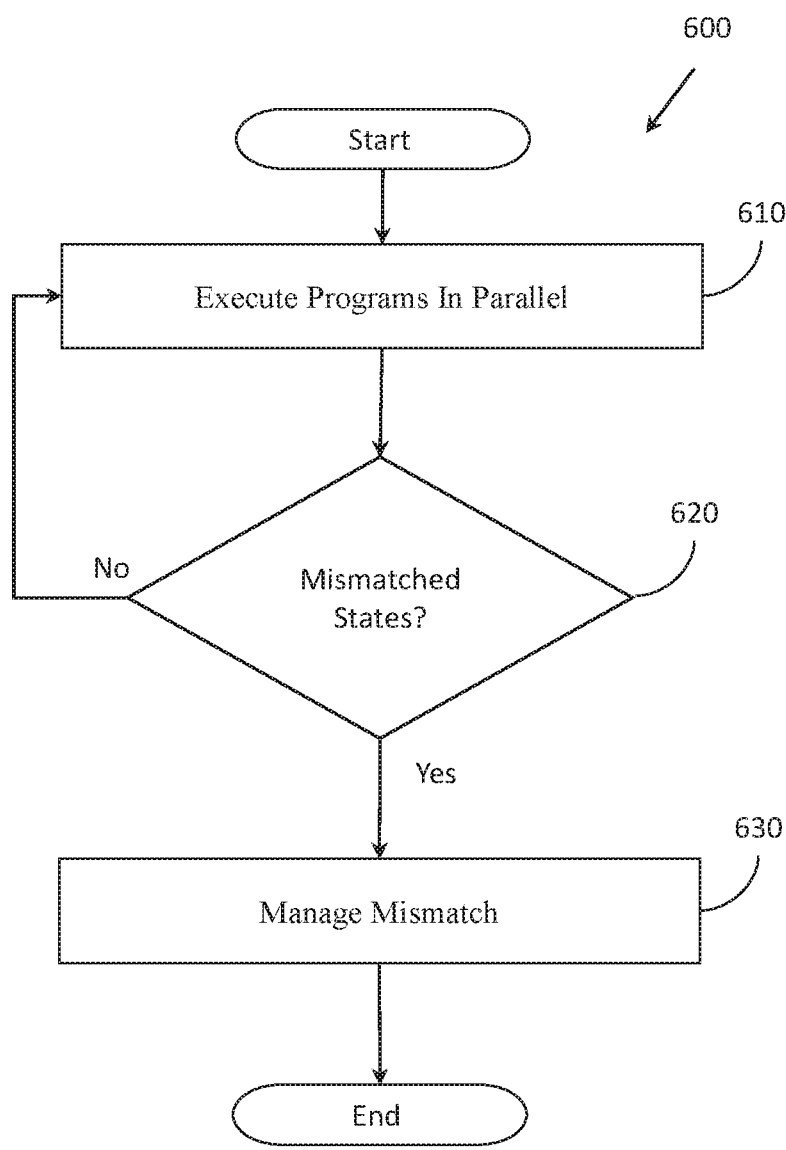
FIG. 6 illustrates one embodiment of a method associated with supervising the execution of an instrumented program.

FIG. 6 illustrates a method 600 associated with identifying and handling potential faults in a program. In a similar fashion, as discussed in relation to FIG. 5, method 600 will be discussed from the perspective of the supervisory control system 100 of FIG. 1. While method 600 is discussed in combination with the supervisory control system 100, it should be appreciated that the method 600 is not limited to being implemented within the supervisory control system 100 but is instead one example of a system that may implement the method 600.

At 610, the execution module 130 executes the extended program 170 and the instrumented program 180 in parallel. In one embodiment, the execution module 130 controls the programs 170 and 180 to execute in parallel. That is, the execution module 130, for example, simultaneously initiates the programs 170, and 180 such that the programs 170 and 180 execute in lockstep (i.e., instruction-for-instruction at the same points relative to the baseline program). As previously indicated, the extended program 170 is modified to include delay instructions such that the extended program 170 consumes the same number of execution cycles as the instrumented program 180. Thus, when initiated at the same time and using the same set of values, the programs 170 and 180 parallel one another in execution (i.e., execute the same shared instructions from the baseline program at the same time).

Moreover, the execution module 130 may control the execution of the programs 170 and 180 on separate devices. That is, the execution module 130, in one embodiment, controls an electronic control unit (ECU) to execute the instrumented program, and another ECU or a processor (e.g., processor 110) executing a virtual machine to execute the extended program 170. In either arrangement, the programs 170 and 180 execute simultaneously and in parallel and according to substantially identical execution times.

At 620, the watchdog module 140 supervises the parallel execution at 610 to identify mismatches in execution states between the programs. In one embodiment, the watchdog module 140 monitors inputs, intermediate values, and output values associated with the extended program 170 and the instrumented program 180. In further aspects, the watchdog module 140 also monitors the noted values that form the execution states according to defined possible ranges for the values. That is, the watchdog module 140 acquires a range of expected/possible values for the various execution states through, for example, testing of the program, tracking of the program during verified execution, and so on. The watchdog module 140 may generate a history log of observed values from this monitoring from which the range of values is derived.

Moreover, the comparison of the observed values of the programs 170 and 180 by the watchdog module 140 is generally undertaken to identify when values of the instrumented program 180 do not match the extended program 170. Such a lack of correspondence generally indicates the occurrence of a fault, the onset of a fault, or another aberration that may result in a fault of the program 180. In further aspects, the watchdog module 140 may undertake the comparison according to a defined metric. For example, the watchdog module 140 may accept a variation of a defined percentage as being considered the same values within the execution states. The percentage may be defined according to a margin of error or intrinsic variations present in the provided values.

At 630, the watchdog module 140, upon identifying a mismatch at 620, manages the mismatched state to mitigate effects of associated program faults on the functioning of an associated device (e.g., controller and associated devices/systems). In one embodiment, the watchdog module 140 manages the mismatch by resetting a controller that is executing the program 180. In general, resetting the controller resets the execution states to resolve the program faults. That is, the reset effectively clears the mismatched state from memory and restarts the programs 170 and 180. Additionally, the watchdog module 140, in further embodiments, performs additional actions such as logging the mismatched execution states for subsequent analysis, resetting memory locations associated with the programs 170 and 180, and re-initializing the programs 170 and 180 such that services provided by the program 180 are not interrupted for an extended period of time.

Moreover, it should be noted, in one or more embodiments, the supervisory control system 100 implements the parallel execution and supervision of the programs 170 and 180 according to a functional safety standard such as ISO 26262.

Additionally, it should be appreciated that the supervisory control system 100 from FIG. 1 can be configured in various arrangements with separate integrated circuits and/or chips. In such embodiments, the execution module 130 from FIG. 1 is embodied as a separate integrated circuit. Additionally, the watchdog module 140 is embodied on an individual integrated circuit. Moreover, the instrumentation module 150 is embodied on a separate integrated circuit. The circuits are connected via connection paths to provide for communicating signals between the separate circuits. Of course, while separate integrated circuits are discussed, in various embodiments, the circuits may be integrated into a common integrated circuit board. Additionally, the integrated circuits may be combined into fewer integrated circuits or divided into more integrated circuits. In another embodiment, the modules 130, 140, and 150 may be combined into a separate application-specific integrated circuit. In further embodiments, portions of the functionality associated with the modules 130, 140, and 150 may be embodied as firmware executable by a processor and stored in a non-transitory memory. In still further embodiments, the modules 130, 140, and 150 are integrated as hardware components of the processor 110.

In another embodiment, the described methods and/or their equivalents may be implemented with computer-executable instructions. Thus, in one embodiment, a non-transitory computer-readable medium is configured with stored computer executable instructions that when executed by a machine (e.g., processor, computer, and so on) cause the machine (and/or associated components) to perform the method.

While for purposes of simplicity of explanation, the illustrated methodologies in the figures are shown and described as a series of blocks, it is to be appreciated that the methodologies are not limited by the order of the blocks, as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional blocks that are not illustrated.

The supervisory control system 100 can include one or more processors 110. In one or more arrangements, the processor(s) 110 can be a main processor of the supervisory control system 100. For instance, the processor(s) 110 can be an electronic control unit (ECU). The supervisory control system 100 can include one or more data stores for storing one or more types of data. The data stores can include volatile and/or non-volatile memory. Examples of suitable data stores include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, distributed memories, cloud-based memories, other storage medium that are suitable for storing the disclosed data, or any combination thereof. The data stores can be a component of the processor(s) 110, or the data store can be operatively connected to the processor(s) 110 for use thereby. The term "operatively connected," as used throughout this description, can include direct or indirect connections, including connections without direct physical contact.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-6, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Examples of such a computer-readable medium may include, but are not limited to, a floppy disk, a flexible disk, a hard disk, a magnetic tape, other magnetic medium, an ASIC, a cache or other memory of a GPU, a CD, other optical medium, a RAM, a ROM, a memory chip or card, a memory stick, and other media from which a computer, a processor or other electronic device can read. In the context of this document, a computer-readable storage medium may be any tangible medium that can contain, or store a program for use by or in connection with an instruction execution system, apparatus, or device.

The following includes definitions of selected terms employed herein. The definitions include various examples and/or forms of components that fall within the scope of a term, and that may be used for various implementations. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Module," as used herein, includes a computer or electrical hardware component(s), firmware, a non-transitory computer-readable medium that stores instructions, and/or combinations of these components configured to perform a function(s) or an action(s), and/or to cause a function or action from another logic, method, and/or system. Module may include a microprocessor controlled by an algorithm, a discrete logic (e.g., ASIC), an analog circuit, a digital circuit, a programmed logic device, a memory device including instructions that when executed perform an algorithm, and so on. A module, in one or more embodiments, includes one or more CMOS gates, combinations of gates, or other circuit components. Where multiple modules are described, one or more embodiments include incorporating the multiple modules into one physical module component. Similarly, where a single module is described, one or more embodiments distribute the single module between multiple physical components.

Additionally, module, as used herein, includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a GPU, a hardware component of a system on a chip (SoC), as a programmable logic array (PLA), or as another suitable hardware component that is embedded with a defined configuration set (e.g., instructions) for performing the disclosed functions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . ." as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A supervisory control system for improving detection of program faults, comprising:
   one or more processors;
   a memory communicably coupled to the one or more processors and storing:
   an execution module including instructions that when executed by the one or more processors cause the one or more processors to execute, in parallel, an extended program and an instrumented program, wherein the instrumented program is an instrumented version of a baseline program that implements runtime checks, and wherein the extended program is an extended version of the baseline program with intentional delays inserted into source code of the baseline program to match an execution time with the instrumented program; and
   a watchdog module including instructions that when executed by the one or more processors cause the one or more processors to supervise execution states of the instrumented program to identify an occurrence of mismatched states between the extended program and the instrumented program,
   wherein the watchdog module includes instructions to manage the mismatched states to mitigate effects of the program faults on functioning of an associated device.

2. The supervisory control system of claim 1, wherein the watchdog module includes instructions to manage the mismatched states including instructions to reset a controller of the associated device on which the extended program and the instrumented program are executing, and wherein the watchdog module includes instructions to reset the controller by resetting the execution states to resolve the program faults.

3. The supervisory control system of claim 1, wherein the watchdog module includes instructions to supervise the execution states of the instrumented program and the extended program including instructions to monitor inputs, intermediate values, and output values associated with the extended program and the instrumented program during execution.

4. The supervisory control system of claim 3, wherein the watchdog module includes instructions to monitor the execution states including instructions to compare the inputs, intermediate values, and the output values between the extended program and the instrumented program to identify differences that are reported as the mismatched states.

5. The supervisory control system of claim 3, wherein the watchdog module includes instructions to monitor the execution states including instructions to compare the inputs, intermediate values, and the output values with a defined range of acceptable values to identify the mismatched states.

6. The supervisory control system of claim 1, wherein the execution module includes instructions to execute the extended program and the instrumented program in parallel including instructions to execute the extended program and the instrumented program on separate devices.

7. The supervisory control system of claim 1, wherein the extended program includes the intentional delays that are No-Op instructions that cause the associated device to do nothing for a defined number of cycles in order to account for execution cycles consumed by instrumentation within the instrumented program, wherein the runtime checks are implemented within the instrumented program through inclusion of instrumentation in source code of the baseline program to create the instrumented program, and
   wherein the runtime checks guard against at least memory corruption associated with the instrumented program.

8. The supervisory control system of claim 1, wherein the execution module includes instructions to execute the extended program on a first controller and the instrumented program on a second controller, and wherein the first controller and the second controller are embedded within the associated device.

9. A non-transitory computer-readable medium storing instructions for improving detection of program faults and that when executed by one or more processors cause the one or more processors to:
   execute, in parallel, an extended program and an instrumented program, wherein the instrumented program is an instrumented version of a baseline program that implements runtime checks, and wherein the extended program is an extended version of the baseline program with intentional delays inserted into source code of the baseline program to match an execution time with the instrumented program;
   supervise execution states of the instrumented program to identify an occurrence of mismatched states between the extended program and the instrumented program; and
   manage the mismatched states to mitigate effects of the program faults on functioning of an associated device.

10. The non-transitory computer-readable medium of claim 9, wherein the instructions to manage the mismatched states include instructions to reset a controller of the associated device on which the extended program and the instrumented program are executing, and wherein the instructions to reset the controller include instructions to reset the execution states to resolve the program faults.

11. The non-transitory computer-readable medium of claim 9, wherein the instructions to supervise the execution states of the instrumented program and the extended program including instructions to monitor inputs, intermediate values, and output values associated with the extended program and the instrumented program during execution.

12. The non-transitory computer-readable medium of claim 11, wherein the instructions to monitor the execution states include instructions to compare the inputs, intermediate values, and the output values between the extended program and the instrumented program to identify differences that are reported as the mismatched states.

13. The non-transitory computer-readable medium of claim 11, wherein the instructions to execute the extended program and the instrumented program in parallel include instructions to execute the extended program and the instrumented program on separate devices.

14. A method for improving detection of program faults, comprising:

executing, in parallel, an extended program and an instrumented program, wherein the instrumented program is an instrumented version of a baseline program that implements runtime checks, and wherein the extended program is an extended version of the baseline program with intentional delays inserted into source code of the baseline program to match an execution time with the instrumented program;

supervising execution states of the instrumented program to identify an occurrence of mismatched states between the extended program and the instrumented program; and managing the mismatched states to mitigate effects of the program faults on functioning of an associated device.

15. The method of claim 14, wherein managing the mismatched states includes resetting a controller of the associated device on which the extended program and the instrumented program are executing, and wherein resetting the controller resets the execution states to resolve the program faults.

16. The method of claim 14, wherein supervising the execution states of the instrumented program and the extended program includes monitoring inputs, intermediate values, and output values associated with the extended program and the instrumented program.

17. The method of claim 16, wherein monitoring the execution states includes comparing the inputs, intermediate values, and the output values between the extended program and the instrumented program to identify differences that are reported as the mismatched states.

18. The method of claim 16, wherein monitoring the execution states includes comparing the inputs, intermediate values, and the output values with a defined range of acceptable values to identify the mismatched states.

19. The method of claim 14, wherein executing the extended program and the instrumented program in parallel includes executing the extended program and the instrumented program on separate devices.

20. The method of claim 14, wherein the extended program includes the intentional delays that are No-Op instructions that cause an associated device to do nothing for a defined number of cycles in order to account for execution cycles consumed by instrumentation within the instrumented program, wherein the runtime checks are implemented within the instrumented program through inclusion of instrumentation in source code of the baseline program to create the instrumented program, and wherein the runtime checks guard against at least memory corruption associated with the instrumented program.

* * * * *